United States Patent
Oba

(10) Patent No.: US 7,748,913 B2
(45) Date of Patent: Jul. 6, 2010

(54) FUSION SPLICING STRUCTURE OF OPTICAL FIBERS

(75) Inventor: Yasuhiro Oba, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 12/120,746

(22) Filed: May 15, 2008

(65) Prior Publication Data
US 2009/0074362 A1    Mar. 19, 2009

(30) Foreign Application Priority Data

May 15, 2007  (JP) .................. 2007-129034
Oct. 1, 2007  (JP) .................. 2007-257507

(51) Int. Cl.
*G02B 6/255* (2006.01)
(52) U.S. Cl. .................. 385/96; 385/95; 385/97; 385/98; 385/99; 385/126; 385/127
(58) Field of Classification Search .................. 385/95, 385/96, 97, 98, 99, 126, 127, 128; 65/406, 65/407
See application file for complete search history.

(56) References Cited

U.S. PATENT DOCUMENTS

| | | | |
|---|---|---|---|
| 4,537,468 A * | 8/1985 | Degoix et al. | 385/96 |
| 5,208,883 A | 5/1993 | Hattori et al. | 385/43 |
| 5,898,715 A | 4/1999 | LeGrange et al. | 372/6 |
| 6,012,856 A * | 1/2000 | Kim et al. | 385/99 |
| 6,335,822 B1 | 1/2002 | Toyohara | 359/341.1 |
| 6,597,853 B2 | 7/2003 | Cabot et al. | 385/135 |
| 6,608,951 B1 * | 8/2003 | Goldberg et al. | 385/43 |
| 7,037,003 B2 * | 5/2006 | Christensen et al. | 385/96 |
| 7,373,070 B2 * | 5/2008 | Wetter et al. | 385/134 |
| 2002/0034364 A1 * | 3/2002 | Veng | 385/96 |
| 2003/0012526 A1 * | 1/2003 | Riis et al. | 385/96 |
| 2006/0245708 A1 | 11/2006 | Seo et al. | 385/128 |
| 2007/0206909 A1 * | 9/2007 | Wetter et al. | 385/92 |
| 2009/0074362 A1 * | 3/2009 | Oba | 385/96 |

FOREIGN PATENT DOCUMENTS

| | | |
|---|---|---|
| JP | 534540 A | 2/1993 |
| JP | 1010353 A | 1/1998 |
| JP | 2000252559 A | 9/2000 |
| JP | 3433900 B2 | 5/2003 |
| WO | 2004066007 A1 | 8/2004 |

* cited by examiner

*Primary Examiner*—Brian M Healy
(74) *Attorney, Agent, or Firm*—Sughrue Mion, PLLC

(57) ABSTRACT

The present invention is a splicing structure of optical fibers for fusing a double clad fiber and a single clad fiber, the splicing structure is provided with a block covering a fusion splicing point of the double clad fiber and the single clad fiber, and which is made of a highly thermal conductive material.

10 Claims, 7 Drawing Sheets

FUSION SPLICING STRUCTURE OF OPTICAL FIBERS

CROSS-REFERENCE TO RELATED APPLICATIONS

The present application claims the right of priority to the Japanese Patent Application No. 2007-129034 filed on May 15, 2007 and the Japanese Patent Application No. 2007-257507 filed on Oct. 1, 2007, the content of which is incorporated herewith by reference.

BACKGROUND OF THE INVENTION

1. Field of the Invention

The present invention relates to a fusion splicing structure of a rare earth-added double clad fiber and a single clad fiber for light amplification used in optical fiber amplifiers and optical fiber laser light sources, and in particular to a fusion splicing structure which can be increased in service life of a fiber coating material and greatly improved in reliability by managing appropriately the heat dissipation at a fusion splicing point.

2. Description of Related Art

In optical fiber amplifiers and optical fiber laser light sources, a double clad fiber is used as optical fibers for light amplification. The double clad fiber is made up of a core region to which rare earth is added, a first clad region disposed around the core region and a second clad region also disposed around the first clad region. In the double clad fiber, excitation light is propagated through the core region and the first clad region, and signal beams are propagated through the core region. Since rare earth ions are excited by excitation light which is made incident, induced emission light is disseminated from the rare earth ions upon propagation of signal beams inside the core region, thereby amplifying the signal beams. If a single clad fiber is spliced to the output end, excitation light is not propagated but only the signal beams are propagated through the core, thereby outputting high-quality signal beams.

Conventionally, there have been disclosed technologies for fusion splicing structures of optical fibers, for example, as shown in the following Patent Documents 1 to 6.

Patent Document 1 discloses a structure in which a protective coating is not damaged when leaked light from double clad fibers is 1 W. In this conventional technology, a material high in heat resistance is used as a coating material.

Patent Document 2 discloses that a transparent ultraviolet cured resin is used as a fiber coating material to suppress the absorption of leakage light resulting from bending. In this conventional technology, a primary coating layer is greater in refractive index than a clad layer, and a secondary coating layer is greater in refractive index than the primary coating layer.

Patent Document 3 discloses a structure in which a double clad coating is partially removed and which is used to coat a material higher in refractive index than a first clad.

Patent Document 4 discloses treatment in which alumite, gold, or silver etc., is deposited on the inner wall to absorb light.

Patent Document 5 discloses that light is absorbed by black alumite treatment.

Patent Document 6 discloses a structure in which a first and a second reinforcement substrate are fixed by using a soft adhesive agent and both ends of a fiber and a first reinforcement substrate are fixed by an adhesive agent.

Patent Document 1: Japanese Patent No. 3433900

Patent Document 2: PCT International Publication No. WO 2004/66007

Patent Document 3: Japanese Unexamined Patent Application, First Publication No. 2000-252559

Patent Document 4: Japanese Unexamined Patent Application, First Publication No. 10-10353

Patent Document 5: U.S. Pat. No. 6,597,853

Patent Document 6: Japanese Unexamined Patent Application, First Publication No. H5-34540

Since excitation light being propagated through the first clad of the double clad fiber is absorbed by rare earth ions, the excitation light attenuates while propagation. However, substantially 10% of excitation light is not absorbed by rare earth ions but propagated as it is. Therefore, at a part of splicing the double clad fiber and the single clad fiber, excitation light is emitted to a space from a fusion splicing point, some of which is absorbed by a coating material while propagation through a clad region of the single clad fiber, and thereby a coating material and thereby converted into thermal energy. In a case where signal output is amplified to high power, for example, several watts to several hundred watts, the amount of excitation light must be increased to result in an increased heating value of coating materials. Thus, generally used coating materials may be discolored or burnt when used for a prolonged time, which contributes to a decrease in reliability.

Further, in a case where optical fibers are subjected to fusion splicing with each other, a general practice is that the fusion splicing point is reinforced. However, if a resin having a higher refractive index than air is used to reinforce the fusion splicing point, the numerical aperture (hereinafter, abbreviated as NA) is decreased at a fusion splicing point and also high-power excitation light is released from the fusion splicing point. Therefore, there is a possibility that a reinforcement resin in contact with this point may burn, and the reinforcement resin and a coating is not brought closer to the fusion splicing point.

Still further, the loss of signal beams also takes place at a fusion splicing portion, leaked signal beams are propagated through a clad region of the single clad fiber, absorbed by a coating material and converted into thermal energy. A great signal loss may damage a coated portion. Since signal beams are fewer in NA, there is a case where a coating at the side of the proximal end several millimeters to several dozen millimeters from a fusing point may be damaged.

The present invention has been made in view of the above situation, an object of which is to provide a fusion splicing structure in which at a fusion splicing portion of a double clad fiber and a single clad fiber, a fusion splicing point is appropriately managed for heat dissipation, thus making it possible to extend the service life of a fiber coating material and also greatly improve the reliability.

SUMMARY OF THE INVENTION

The fusion splicing structure of optical fibers of the present invention is an optical-fiber splicing structure for fusing a double clad fiber and a single clad fiber, the fusion splicing structure includes a block covering a fusion splicing point of the double clad fiber and the single clad fiber, and which is made of a highly thermal conductive material.

The fusion splicing structure of optical fibers of the present invention may be provided with a resin for coating at least any one of a clad of the double clad fiber and that of the single clad fiber in the vicinity of the fusion splicing point. It is preferable that the light transmittance of the resin be 90% or higher in a light wavelength range of 800 nm to 1100 nm.

The fusion splicing structure of optical fibers of the present invention may be provided with a resin for coating a clad of the single fiber. It is preferable that the refractive index of the resin be higher than that of the clad of the single fiber.

The fusion splicing structure of optical fibers of the present invention may be provided with a resin for coating a first clad of the double clad fiber inside the block. It is preferable that the refractive index of the resin be higher than that of the first clad, and the block be provided with an infrared-ray absorbing layer.

In the fusion splicing structure of optical fibers of the present invention, it is preferable that any one of the double clad fiber or the single clad fiber be solidly adhered to one end of the block by using a hard resin, while the other is flexibly adhered to the other end of the block by using a soft resin, and the fiber adhered to the other end of the block by using the soft resin be solidly adhered to a substrate to which the block is fixed outside the block.

The fusion splicing structure of optical fibers of the present invention may be provided with a resin for coating a first clad of the double clad fiber in front of the fusion splicing point. It is preferable that the refractive index of the resin be lower than that of the clad and also higher at a site closer to the fusion splicing point, and the double clad fiber be decreased in numerical aperture.

The fusion splicing structure of optical fibers of the present invention may be provided with a resin for coating the fusion splicing point.

In the fusion splicing structure of optical fibers of the present invention, an infrared absorbing material may be formed on the surface of the block excluding a region where substantially 20% to 90% of an amount of the emitted excitation light is initially reflected. It is preferable that the infrared absorbing material be not formed at the region.

In the fusion splicing structure of optical fibers of the present invention, the fusion splicing point of the double clad fiber and the single clad fiber is covered with a block made up of a highly thermal conductive material. Excitation light transferred from the double clad fiber to the single clad fiber is emitted from a resin which coats a clad in the vicinity of the fusion splicing point, converted to heat upon absorption by an infrared-ray absorbing layer of the block disposed in the vicinity thereof, and absorbed into the block. Thereby, it is possible to prevent the deterioration of fiber coating due to the leakage of excitation light from the fusion splicing point and therefore provide a fusion splicing structure longer in service life and higher in reliability.

In the fusion splicing structure of optical fibers of the present invention, the fusion splicing point of the double clad fiber and the single clad fiber are enclosed by a metal block. Light emitted from the fusion splicing point is reflected and absorbed on the metal block, and not irradiated on the fiber coating, thus making it possible to retard the progress of deterioration of a fiber coating resin. As an example, temperature rise at the fusion splicing point of the double clad fiber and the single clad fiber has been estimated to find that the service life of resin is increased from 30,000 hours to 50,000 hours, thus leading to improvement in reliability.

Further, the fusion splicing structure of optical fibers of the present invention is provided with a resin for coating the first clad of the double clad fiber inside the block, in which the resin is higher in refractive index than the first clad and an infrared-ray absorbing layer is disposed on the block. No infrared-ray light is absorbed, thereby removing the fear of deterioration or burning of the resin. Since excitation light can be emitted from the side face of the double clad fiber in front of the fusion splicing point, it is possible to decrease the amount of leakage light at the fusion splicing point and dissipate heat effectively.

Also, since the fusion splicing point is coated with a resin, there is no possibility that the fusion splicing point may be contaminated with dust. Further, since excitation light can be emitted in front of the fusion splicing point to adjust the amount of leakage light at the fusion splicing point, there is no fear that the resin for coating the fusion splicing point may be deteriorated.

Further, regarding the part of fixing both the fibers and the metal block, one of the fibers is adhered by using a hard resin and the other is fixed by using a rubber-type resin lower in Young's modulus. Therefore, even where there is a difference in coefficient of linear expansion between the fibers and the metal block, such a state is developed that no tension is rendered on the one side, and the fibers are able to follow up the expansion and contraction of the metal, thereby it is less likely to develop tension or bending on the fibers.

Still further, the resin for coating the first clad of the double clad fiber in front of the fusion splicing point is lower in refractive index than the clad and also higher at a site closer to the fusion splicing point, and the double clad fiber is decreased in numerical aperture. As a result, light is leaked from the side face of the double clad fiber, thus making it possible to dissipate heat effectively.

In addition, since no infrared absorbing material is formed on the surface of the metal block at a region where substantially 20% to 90% of the thus emitted excitation light but the infrared absorbing material is formed on the surface of the metal at a region other than the above region, light can be uniformly absorbed inside the region of the metal block. Thereby, heat is dispersed to attain effective dissipation.

DESCRIPTION OF THE PREFERRED EMBODIMENTS

First Embodiment

Figure 1:
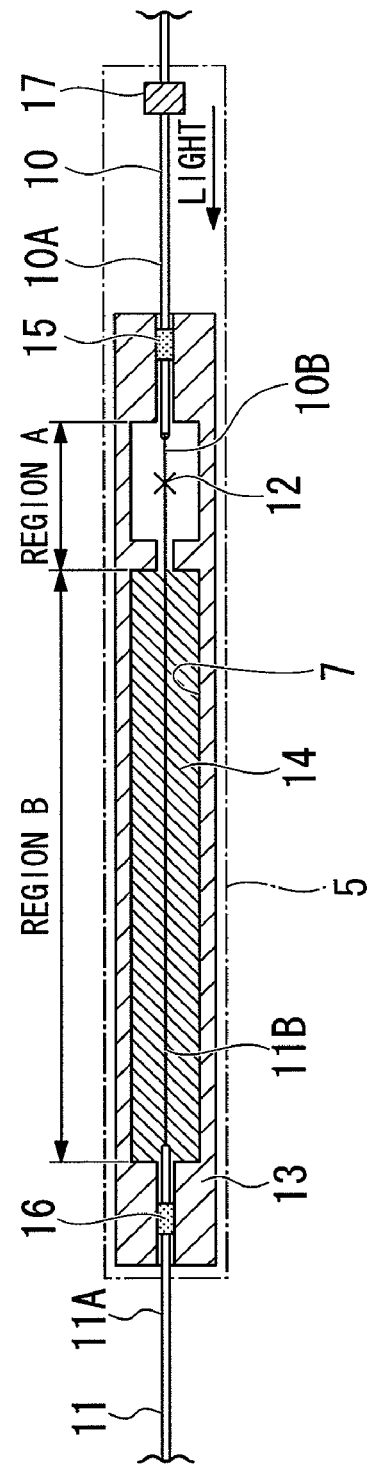
FIG. 1 is a cross sectional view showing First Embodiment of the fusion splicing structure of optical fibers of the present invention.

FIG. 1 shows First Embodiment of the fusion splicing structure of optical fibers of the present invention.

FIG. 1 shows a double clad fiber 10, a single clad fiber 11, an aluminum block 13 covering a fusion splicing point 12 of the double clad fiber 10 and the single clad fiber 11, and a resin 14 filled into the aluminum block 13. A coating 10A and a coating-removed portion 10B are formed on the double clad fiber 10, and first and second clads to be described later are exposed at the coating-removed portion 10B. A coating 11A and a coating-removed portion 11B are formed on the single clad fiber 11, and a clad to be described later is exposed at the coating-removed portion 11B. The distal end of double clad fiber 10 and that of the single clad fiber 11 are subjected to a fusion splicing for the respective clads at the fusion splicing point 12. The double clad fiber 10 is adhered to the aluminum block 13 at a first adhesion portion 15, and the single clad fiber 11 is adhered to the aluminum block 13 at a second adhesion portion 16.

The fusion splicing structure of optical fibers of the present embodiment is a fusion splicing structure for splicing the double clad fiber 10 and the single clad fiber 11, in which a clad exposed on the coating removed portion 11B at the side of the fusion splicing point 12 of the single clad fiber 11 is coated with the resin 14, the refractive index of which is higher than that of the clad. Further the aluminum block 13 made of a highly thermal conductive material covers the resin 14, and the aluminum block 14 is provided with an infrared-ray absorbing layer 7. The double clad fiber 10 and the single clad fiber 11 are respectively adhered and fixed to both ends of the aluminum block 13 by using an adhesive agent, and a first adhesion portion 15 and a second adhesion portion 16 are respectively formed at the both ends of the aluminum block.

The double clad fiber 10 is constituted with a core made of quartz glass to which a rare earth element such as erbium, ytterbium or thulium is added, a first clad made of quartz glass lower in refractive index than the core, and a second clad made of a material lower in refractive index than the first clad. The second clad may be formed of a transparent resin having a lower refractive index to also act as the coating 10A. A signal beam source is coupled to an excitation light source at an incident end of the double clad fiber 10 (not indicated) so that signal beams are made incident on the core and excitation light is made incident on the first clad.

In the fusion splicing structure of optical fibers of the present embodiment, the coating 11A of the single clad fiber 11 which is at the side of the proximal end from the fusion splicing point 12 is removed at an appropriate length to form the coating removed portion 11B at which the clad is exposed. The fusion splicing point 12 prepared by subjecting the ends of both the fibers 10, 11 to a fusion splicing is situated at a region A on the aluminum block 13, and the fusion splicing point 12 is covered with the aluminum block 13, the inner face of which is given black alumite treatment acting as an infrared-ray absorbing layer 7. Excitation light emitted from the fusion splicing point 12 is substantially absorbed by a black alumite layer and heat-dissipated to the aluminum block 13. Therefore, there is no possibility that light leaked from the fusion splicing point 12 is irradiated to a resin or parts etc., in the vicinity thereof to cause discoloration or other harmful effects.

The region B of the aluminum block 13 is such that a resin 14 having higher refractive index than that of the clad of the single clad fiber 11 (refractive index of the clad is substantially equal to 1.45) is filled into a groove of the aluminum block 13 and the coating-removed portion 11B of the single clad fiber 11 is embedded thereinto. Excitation light which is propagated through the clad of the single clad fiber 11 is emitted from the clad at the region B and thereafter converted to heat by black alumite, and absorbed by the main body of the aluminum block 13. The absorption rate of the resin 14 to be filled into the region B is preferably 90% or higher with respect to the wavelength of the excitation light. In a case where transmittance of the resin 14 is lower, the resin in itself absorbs excitation light to cause a temperature rise. Therefore, it is preferable to select a resin based on silicone, fluorine or epoxy higher in heat resistance.

The length of the region B is determined in accordance with the NA (numerical aperture of fusion splicing point) of the first clad of the double clad fiber 10 and the refractive index of the resin 14. It is necessary that excitation light is substantially emitted at the region B but not propagated through the coating 11A of the single clad fiber 11. In a case where the refractive index of the resin 14 is from substantially 1.53 to 1.54, if the length of the region B is substantially 30 mm, a sufficient emission of excitation light is attained. It is necessary that the resin 14 is higher in refractive index than the clad. In a case where the refractive index of the resin 14 is excessively close to that of the clad to result in an emission of excitation light at a short distance, there is a possibility that the aluminum block may be increased in temperature and the resin may be deteriorated. Therefore, the refractive index of the resin 14 is preferably 1.5 or higher.

In this instance, an explanation will be specifically made for reasons that the transmittance of the resin 14 to be filled into the region B is preferably 90% or higher with respect to the wavelength of excitation light.

Assuming that all excitation light which has been emitted is absorbed into a resin, the following relationship between temperature rise in the resin and the absorption rate of the resin is obtained.

$V \cdot \rho \cdot Cp \cdot \Delta T = p \cdot t \cdot \alpha$ (In the formula, V denotes capacity of resin; $\rho$, density; Cp, specific heat; T, temperature; p, amount of excited leakage light; t, thermal equilibrium time; and $\alpha$, absorption rate.)

For example, in a case where a silicone resin is used to coat fibers at an appropriate amount, $\Delta T$=substantially 35° C. is obtained under the conditions of p=3 W and $\alpha$=10% (transmittance of 90%). If this temperature is attained, a sufficient margin is provided from the degradation temperature. Even if the absorption rate is changed to several percentages with the lapse of time, the resin is not yet decomposed even after 30,000 hours.

Similarly, under the condition of $\alpha$=15% (transmittance of 85%), $\Delta T$=53° C. is obtained, and the temperature is increased by 18° C. or more, as compared with the time when $\alpha$=10% is given. In a case where an initial temperature is higher by 18° C., the deterioration of the resin proceeds in an accelerating manner (increase in absorption rate), resulting in an earlier arrival at the degradation temperature. In reality, this resin has difficulty in being adopted for this purpose. Therefore, the resin 14 with an absorption rate of 10% or less (transmittance of 90% or more) is preferably filled into the region B.

A resin R1 with the transmittance of 90% and a resin R2 with the transmittance of 85% were used to fill these resins into the region B in the fusion splicing structure given in FIG. 1, thereafter an optical fiber amplifier was operated to measure the temperatures of the resins, the results of which are shown in the table below.

|  | RESIN R1 TRANSMITTANCE OF 90% | RESIN R2 TRANSMITTANCE OF 85% |
| --- | --- | --- |
| INITIAL TEMPERATURE INCREASE ΔT | 35° C. | 53° C. |
| AFTER 30,000 HOURS ΔT | 80° C. | 120° C. |

As shown above, when the resin 14 is 90% or more in transmittance, the initial temperature is low and the temperatures after a prolonged storage also increase to a small extent. The resin having transmittance of which is 90% or more will provide a greater margin from degradation temperatures to improve reliability.

In the present embodiment, the double clad fiber 10 is flexibly adhered to the first adhesion portion 15 of the aluminum block 13 by using a soft resin, for example, an elastomer low in Young's modulus, and the single clad fiber 11 is solidly adhered to the second adhesion portion 16 of the aluminum block 13 by using a hard resin. Further, the double clad fiber 10 is solidly adhered to the substrate 5 in which the aluminum block 13 is fixed outside the aluminum block 13 by using a hard adhesive agent 17. Thereby, no tension is developed on either of the fibers inside the aluminum block 13. The aluminum block 13 is different in coefficient of linear thermal expansion from the fibers 10, 11. However, only one of the adhesion portions 15, 16 is solidly adhered and the other is adhered by using the elastomer so as to be allowed to move. Still further, the fibers 10, 11 are sufficiently long, thus making it possible to follow up the expansion and contraction of the aluminum block 13 so as not to cause breakage of the fibers.

According to the fusion splicing structure of optical fibers of the present embodiment, the clad at the side of the fusion splicing point 12 of the single clad fiber 11 is coated with the resin 14 higher in refractive index than the clad, the aluminum block 13 made of the highly thermal conductive material covers the resin 14, and the aluminum block 13 is provided with the infrared-ray absorbing layer 7. Therefore, excitation light transferred from the double clad fiber 10 to the single clad fiber 11 is emitted from the resin 14 which coats the clad of the single clad fiber 11, absorbed by the infrared-ray absorbing layer 7 of the aluminum block 13 disposed around the resin 14 for heat conversion, and heat is absorbed into the aluminum block 13. Therefore, the coating material of the fibers is prevented from being deteriorated due to leakage of excitation light from the fusion splicing point 12, thus making it possible to provide a fusion splicing structure longer in service life and higher in reliability.

The double clad fiber 10 may be adhered to the first adhesion portion 15 of the aluminum block 13 by using a hard resin, and the single clad fiber 11 may be adhered to the second adhesion portion 16 of the aluminum block 13 by using a soft resin. In this instance, it is preferable that the single clad fiber 11 is solidly adhered to the substrate 5 outside the aluminum block 13 by using a hard adhesive agent. Thereby, no tension is developed on the fibers 10, 11 inside the aluminum block 13.

Second Embodiment

Figure 2:
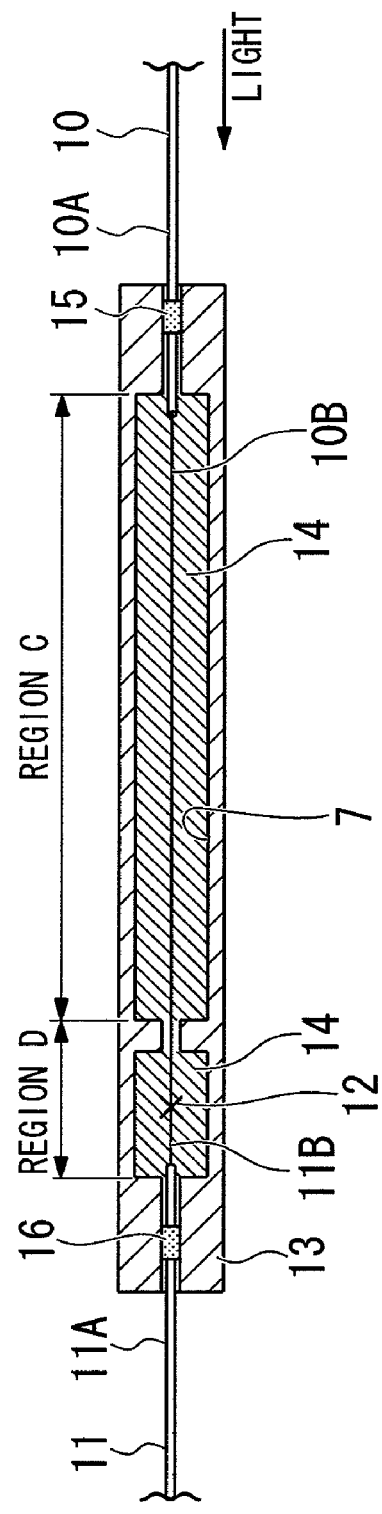
FIG. 2 is a cross sectional view showing Second Embodiment of the fusion splicing structure of optical fibers of the present invention.

FIG. 2 shows Second Embodiment of the fusion splicing structure of optical fibers of the present invention. The fusion splicing structure of optical fibers of the present embodiment includes the same constituents as those used in the splicing structure of First Embodiment, and the same numerals or symbols are given to the same constituents.

In the fusion splicing structure of optical fibers of the present embodiment, a coating-removed portion 10B in which the first clad of the double clad fiber 10 is exposed is accommodated inside the aluminum block 13 at a region C in front of the fusion splicing point 12 (on the double clad fiber). The coating-removed portion 10B is coated with the resin 14 higher in refractive index than the first clad, and the resin 14 is also enclosed by the aluminum block 13 in which black alumite functioning as the infrared-ray absorbing layer 7 is formed internally.

Further, at a region D in the vicinity of the fusion splicing point 12, the fusion splicing point 12 is reinforced by coating the fusion splicing point 12 and the coating-removed portions 10B, 11B of the respective fibers 10, 11 on both sides of the fusion splicing point 12 by using a resin 14, and also covered by the aluminum block 13. Still further, the fibers 10, 11 are respectively adhered and fixed to both ends of the aluminum block 13 to form a first adhesion portion 15 and a second adhesion portion 16. The resin 14 is preferably transparent with respect to infrared excitation light. This is because the resin can be prevented from a temperature rise resulting from the absorption of leakage light.

According to the fusion splicing structure of optical fibers of the present embodiment, the first clad of the double clad fiber 10 close to the fusion splicing point 12 is coated with the resin 14 higher in refractive index than the clad, the aluminum block 13 made of the highly thermal conductive material covers the resin 14, and the aluminum block 13 is provided with the infrared-ray absorbing layer 7. Therefore, excitation light is emitted from the resin 14 which coats the clad of the double clad fiber 10 in front of the fusion splicing point 12, absorbed by the infrared-ray absorbing layer 7 disposed around the resin 14 for heat conversion, and heat is absorbed into the aluminum block 13. Therefore, the coating material of the fibers is prevented from being deteriorated due to leakage of excitation light, thus make it possible to provide a fusion splicing structure longer in service life and higher in reliability.

Further, the present embodiment is constituted so that the resin 14 higher in refractive index than the clad is filled into the region C in front of the fusion splicing point 12 to emit excitation light. Thereby, no more excitation light is emitted from the fusion splicing point 12 and the fusion splicing point 12 can be reinforced by the resin 14, making it possible to provide a fusion splicing structure higher in reliability.

Third Embodiment

Figure 3:
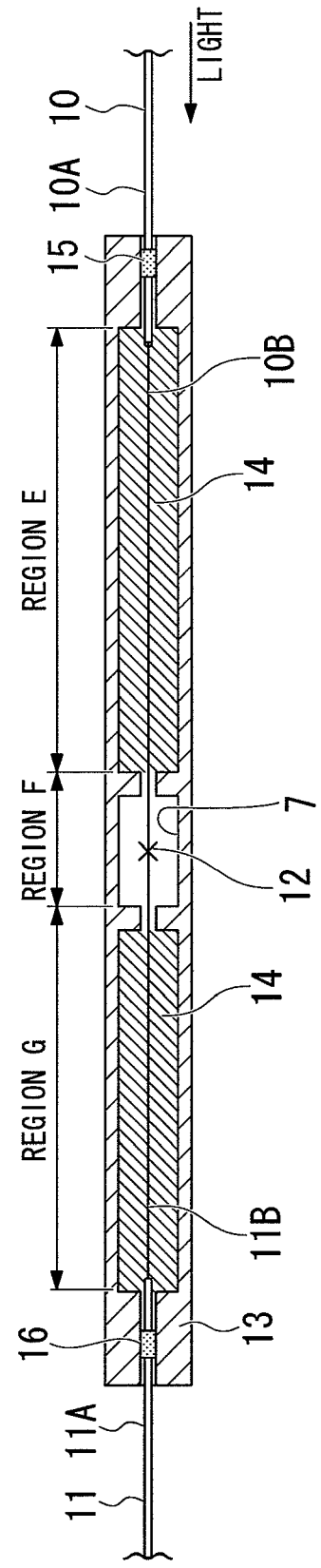
FIG. 3 is a cross sectional view showing Third Embodiment of the fusion splicing structure of optical fibers of the present invention.

FIG. 3 shows Third Embodiment of the fusion splicing structure of optical fibers of the present invention. The fusion splicing structure of optical fibers of the present embodiment includes the same constituents as those used in the splicing structure of First Embodiment, and the same symbols are given to the same constituents.

In the fusion splicing structure of optical fibers of the present embodiment, excitation light is emitted in a stepwise fashion along the longitudinal direction of the aluminum block 13 at three regions, that is, a region E at the side of the double clad fiber 10 from the fusion splicing point 12, a region F having the fusion splicing point 12 and a region G at the side of the single clad fiber 11 from the fusion splicing point 12, thereby diversifying heat-generating regions.

The resin 14 to be filled into the region E is lower in refractive index than the clad, and also smaller in NA than the first clad of the double clad fiber 10 through which excitation light is propagated. Excitation light is subjected to NA transformation at the region E, and a part of the excitation light is in an emission mode, thereby attenuating the output of excitation light propagated through the fibers. The NA at the region E is preferably substantially 50% of the NA of the first clad of the double clad fiber 10. In a case where the NA at the region E is 80% or more than that of the first clad, there is a case where excitation light is hardly emitted. Therefore, it is preferable that the NA at the region E is in a range of 50% to 80% with respect to the NA of the first clad.

The fibers at the region F are not coated with a resin, and the fusion splicing point 12 is enclosed by the aluminum block 13. At the region F, excitation light is emitted from the fusion splicing point 12, converted to heat on an infrared-ray absorbing layer (black alumite treatment layer) of the aluminum block 13, and heat is conducted to the aluminum block 13 for absorption.

Further, the resin 14 at the region G is made higher in refractive index than the clad, thereby excitation light which has not been emitted at the regions F, G is emitted, converted to heat, and heat is conducted to the aluminum block 13 for absorption.

It is noted that in the present embodiment where excitation light is emitted in a stepwise fashion, there is no limitation on the three regions. In view of a relationship between the output of excitation light and temperature rise on the aluminum block 13, the regions may be additionally increased in number. In this instance, the region E given in FIG. 3 is preferably divided into smaller regions to make the NA smaller in a stepwise fashion.

In a case where the resin is adjusted in refractive index, such a resin is provided that the refractive index thereof can be substantially 80% of the NA of the first clad of the double clad fiber 10, and the resin is adjusted so as to be closer in refractive index to the clad by mixing the resin with a solution to which the same fine particles as a clad material is added. In the case of glass fiber, it is necessary to add fine particles such as colloidal silica to the resin to decrease the refractive index. This is because when light is scattered by fine particles, a propagation distance in the resin is made longer, thereby effective light absorption to the black alumite layer is not attained. Fine particles are preferable, the diameters of which are substantially 1/10 or less than the wavelength of excitation light.

There is no particular limitation on the black alumite treated-aluminum block 13 used in each of the embodiments. An acceptable structure is one in which an infrared-ray absorbing layer is disposed on the surface layer of a material with a high degree of heat conductivity or a constitution in which an infrared absorbing material is scattered near the surface layer of a material higher in infrared absorption rate and also has a high degree of heat conductivity or a material with a high degree of heat conductivity. Materials with a high degree of heat conductivity include, for example, aluminum, copper, magnesium and their alloys.

Fourth Embodiment

Figure 4:
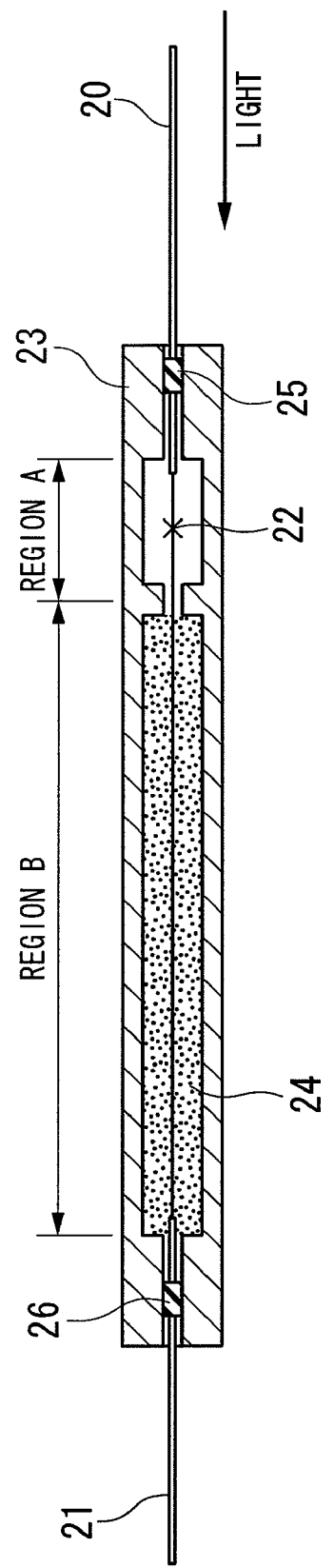
FIG. 4 is a cross sectional view showing Fourth Embodiment of the fusion splicing structure of optical fibers of the present invention.

FIG. 4 shows Fourth Embodiment of the fusion splicing structure of optical fibers of the present invention.

FIG. 4 shows a double clad fiber 20 to which a rare earth element is added, a single clad fiber 21, a fusion splicing point 22 of the double clad fiber 20 and the single clad fiber 21, a metal block 23 covering the fusion splicing point 22, a resin 24 filled into the inside of the metal block 23, a rubber-like resin 25 for fixing the double clad fiber, and a UV cured resin 26 for fixing the single clad fiber.

In the fusion splicing structure of optical fibers of the present embodiment, the fusion splicing point 22 made by subjecting the ends of the double clad fiber 20 and the single clad fiber 21 to a fusion splicing is enclosed by the metal clad block 23 excluding clearances through which the fibers pass. A through hole through which the fibers are allowed to pass is drilled on the metal block 23, the fusion splicing point 22 is accommodated into the region A at the internal space of the block. The resin 24 is filled into the region B at the side of the single clad fiber from the fusion splicing point 22. Further, the double clad fiber 20 is fixed so as to be allowed to move at an end portion of the through hole at one side of the double clad fiber by using the rubber-like resin 25, and the single clad fiber 21 is fixed at an end portion of the through hole at the side of the single clad fiber 21 by using the relatively hard UV cured resin 26.

In the present embodiment, the fusion splicing point 22 of the double clad fiber 20 and the single clad fiber 21 is placed at the region A of the metal block 23. The region A has a structure to coat the fusion splicing point 22 with a metal material high in heat conductivity. Therefore, excitation light emitted from the fusion splicing point 22 and leakage light of signal beams are substantially subjected to repeated reflection and absorption on the inner surface of the metal block 23 and converted to heat, and they are dissipated outside. Therefore, the resin 24 filled into the region B is not influenced by light leaked from the fusing point and not deteriorated.

A resin having a higher refractive index than that of the clad (refractive index of the clad is substantially equal to 1.45) is used as the resin 24 to be filled into the region B. The resin 24 is preferably given the transmittance of 90% or greater with respect to near infrared light (800 nm to 1100 nm). The resin may be cured by using UV or heating. In a case where the resin 24 is greatly filled (filling depth is several millimeters or more), it is desirable to use a thermosetting resin because of a secured curing of such a type of resin. A fiber from which the coating is removed is embedded at the region B. Excitation light propagated through the clad of the single clad fiber 21 is emitted at the region B. Thereafter, excitation light is subjected to repeated reflection and absorption on the metal in the vicinity and converted to heat, and it is dissipated outside. Any highly transparent resins such as those based on silicone, fluorine and epoxy may be selected, with no particular limitation on a type of the resin 24 to be used. The inner surface of the region B of the metal block 23 may be given an alumite treatment, or an infrared absorbing material may be coated, sputtered or deposited thereon.

The length of the region B is determined in accordance with the NA of the first clad of the double clad fiber 20 and the refractive index of the resin 24. It is necessary to substantially emit excitation light at the region B but not to transfer excitation light to the coating portion of the single clad fiber 21. In a case where the refractive index of the resin 24 is substantially 1.53 to 1.54, if the length of the region B is substantially 30 mm, a sufficient emission of excitation light can be obtained. The resin 24 must be higher in refractive index than the clad.

The metal block 23 is fixed to each of the fibers in such a manner that one end thereof is adhered by using a hard adhesive agent and the other end is fixed by using a rubber-like resin smaller in elasticity. In the illustrated example, the double clad fiber 20 is fixed so as to be allowed to move at the end portion of the through hole at the side of the double clad fiber by using a rubber-like resin 25, and the single clad fiber 21 is fixed at the end portion of the through hole at the side of the single clad fiber 21 by using a relatively hard UV cured resin 26. The metal block 23 is different from each of the fibers in coefficient of linear thermal expansion. In the illustrated structure, since the optical fibers are fixed at one end to be allowed to move and also sufficiently long, they can follow up the expansion and contraction of the metal block 23 so as not to cause breakage by adding tension to them.

There is no limitation on the metal block 23 used in the present embodiment. An acceptable constitution is one in which an infrared-ray absorbing layer is disposed on the surface layer of a material with a high degree of heat conductivity or a constitution in which an infrared absorbing material is scattered near the surface layer of a material with a high infrared absorption rate and also has a high degree of heat conductivity or a material with a high degree of heat conductivity. Materials with a high degree of heat conductivity include, for example, aluminum, copper, magnesium and their alloys.

In Fourth Embodiment, the fusion splicing point 22 is enclosed by the metal block 23, and there is no chance that excitation light or a signal beam is irradiated on the coating or the resin etc., at the side of the proximal end from the fusion splicing point 22. Thus, such an advantage is obtained that the resin is prevented from burning or deterioration.

Further, the signal beams and excitation light are converted to thermal energy and directly absorbed via the resin 24 into the metal block 23 excellent in degree of heat conductivity, thereby heat is efficiently dissipated.

Fifth Embodiment

Figure 5:
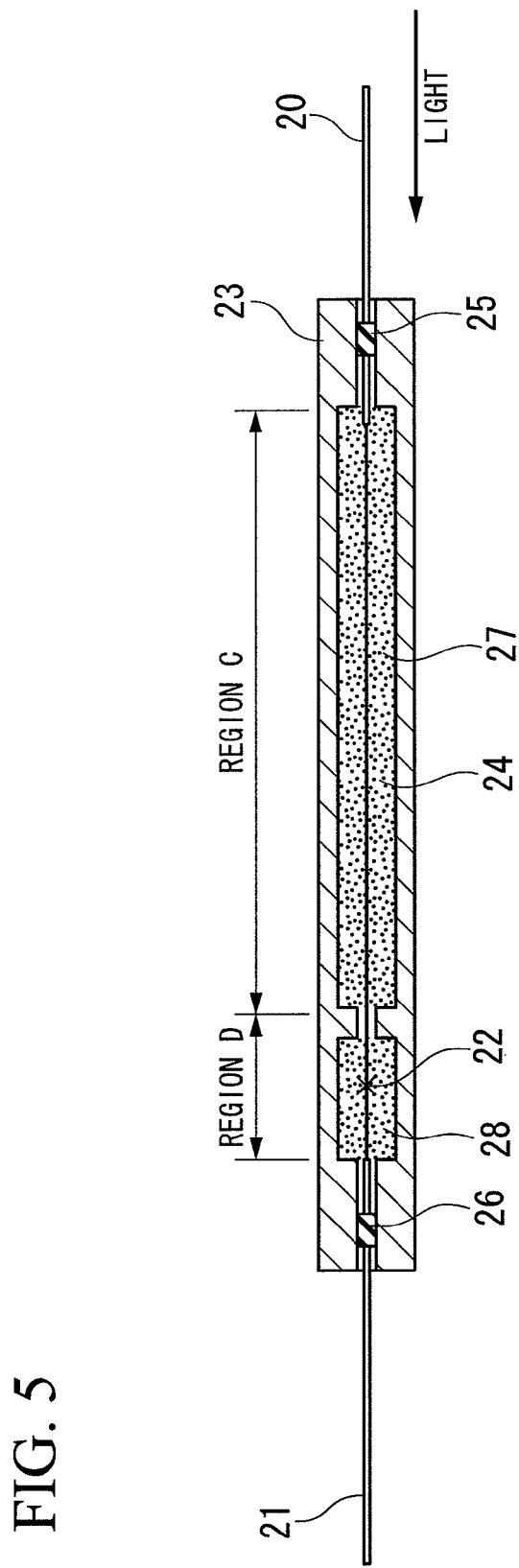
FIG. 5 is a cross sectional view showing Fifth Embodiment of the fusion splicing structure of optical fibers of the present invention.

FIG. 5 shows Fifth Embodiment of the fusion splicing structure of optical fibers of the present invention. In the fusion splicing structure of optical fibers of the present embodiment, the same constituents as those used in the fusion splicing structure of optical fibers of Fourth Embodiment given in FIG. 4 are given the same symbols.

In the present embodiment, a resin 27 higher in refractive index than the clad is filled into the region C in front of the fusion splicing point 22. Excitation light is emitted from the region C. In this structure, no excitation light is emitted from the fusion splicing point 22, thus making it possible to reinforce the fusion splicing point 22 accommodated into the region D in the metal block 23 by using a resin 28. Further, since each of the regions is covered with the metal block 23 excluding a clearance which is approximately equal to the diameter of the fibers, light leaked from each of the regions is not irradiated on adjacent regions. Thus, the adjacent resins are affected to a smaller extent.

Conventionally, since high-power light is emitted at the fusion splicing point 22 in a concentrated manner, the point is not allowed to be reinforced by using a resin or the like, thus resulting in the possibility of the attachment of dust. However, in Fifth Embodiment, since excitation light can be emitted in front of the fusion splicing point 22, the fusion splicing point 22 can be reinforced by using the resin 28 so that no dust or the like is attached on the fusion splicing point 22.

Sixth Embodiment

Figure 6:
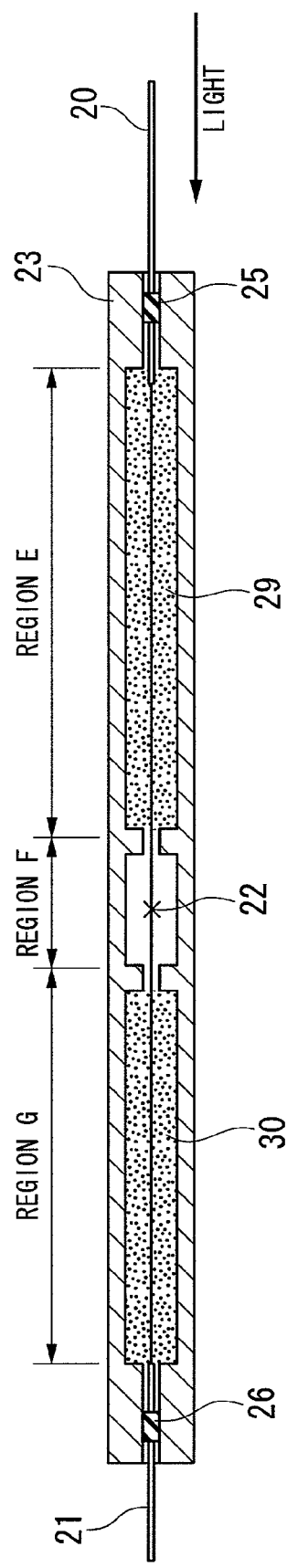
FIG. 6 is a cross sectional view showing Sixth Embodiment of the fusion splicing structure of optical fibers of the present invention.

FIG. 6 shows Sixth Embodiment of the fusion splicing structure of optical fibers of the present invention. In the fusion splicing structure of optical fibers of the present embodiment, the same constituents as those of the fusion splicing structure of optical fibers of Fourth Embodiment given in FIG. 4 are given the same symbols.

The structure of the present embodiment is particularly helpful in a case where excitation light with a greater output is emitted. Three regions, that is, regions E, F, and G are provided inside the metal block 23 for emitting excitation light in a stepwise fashion, thereby diversifying heat generating regions.

The resin 29 to be filled into the region E is lower in refractive index than the clad, and also smaller in NA than the first clad of the double clad fiber 20 through which excitation light is propagated. Excitation light is subjected to NA transformation at the region E, and high NA components are in an emission mode, thereby attenuating the output of excitation light propagated through the fibers. The NA at the region E is preferably substantially 50% of the NA of the first clad of the double clad fiber 20. If the NA at the region E is 80% or more than that of the first clad, there is a case where excitation light is hardly emitted.

At the region F, the fusion splicing point 22 is enclosed by the metal block 23, and signal beams and leakage light of excitation light are emitted from the region.

Further, the resin 30 at the region G is made higher in refractive index than the clad, thereby leakage light which has not been emitted at regions F or G, is emitted.

In the present embodiment, the number of regions at the metal block 23 is not limited to three. In view of a relationship between the output of excitation light and temperature rise in the aluminum block 23, the regions may be additionally increased in number. In this instance, the region E given in FIG. 6 is preferably divided into smaller regions to make the NA smaller in a stepwise fashion. The resin may be continuously increased in refractive index, and continuously decreased the NA.

Both the resins 29, 30 to be filled must be selected from materials transparent with respect to infrared light. The refractive index can be adjusted by an addition of fine particles such as colloidal silica. In this case, the fine particles are preferably made smaller to substantially 1/10 with respect to the wavelength of excitation light. This is because upon the scattering of light in fine particles, propagation distance of light within a resin is shorten, thereby the resin is decreased in absorption rate equivalently to result in decreased durability of the resin.

Sixth Embodiment is effective in a case where excitation light is available in a great amount. So that the resins 29, are changed in refractive index to emit excitation light in a stepwise fashion, heat discharge is made in a non-concentrated manner to attain effective heat dissipation in the metal block 23 as a whole.

Seventh Embodiment

Figure 7:
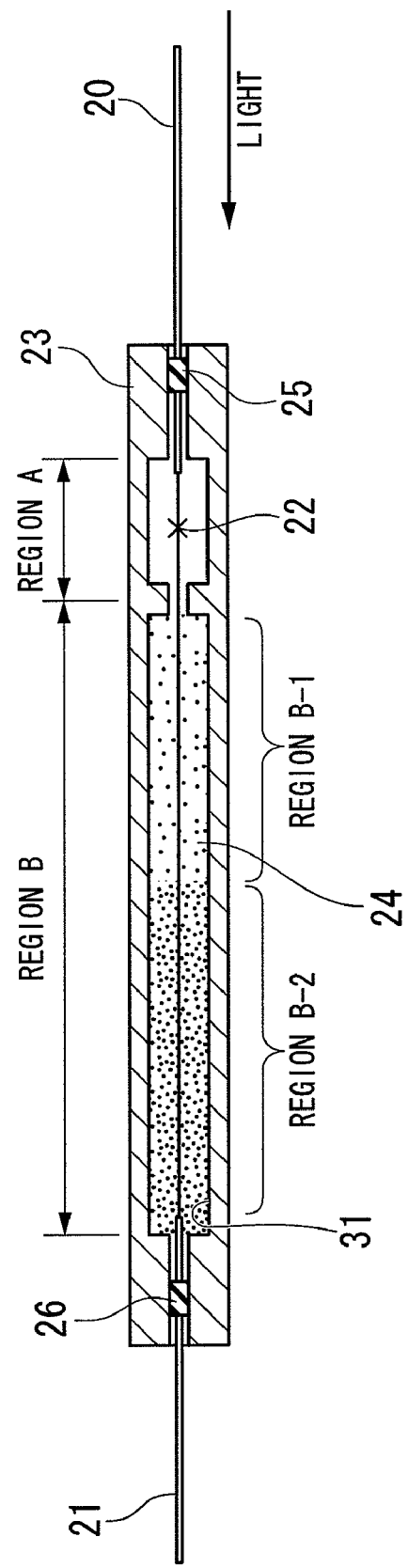
FIG. 7 is a cross sectional view showing Seventh Embodiment of the fusion splicing structure of optical fibers of the present invention.

FIG. 7 shows Seventh Embodiment of the fusion splicing structure of optical fibers of the present invention. In the fusion splicing structure of optical fibers of the present embodiment, the same constituents as those of the fusion splicing structure of optical fibers of Fourth Embodiment given in FIG. 4 are given the same numerals or symbols.

In the present embodiment, a region B-2 where an infrared absorbing material 31 for converting leakage light to heat is surface-treated is disposed at a part of the inner surface of the region B in the metal block 23. The region B (region B-1) where substantially 50% of leakage light is initially reflected is not surface-treated by the infrared absorbing material 31, whereas the region B-2 excluding the region B-1 is surface-treated. Therefore, light can be uniformly absorbed inside the region B in the metal block 23, and heat is dispersed to result in effective heat dissipation. There is no particular limitation on the infrared absorbing material 31 to be used, and any materials which can absorb near infrared light (800 nm to 1100 nm) such as carbon, rare earths or metal materials are acceptable.

Example

Referring to a fusion splicing portion of a double clad fiber and a single clad fiber used in high-power optical fiber lasers, the fusion splicing structure of optical fibers given in FIG. 1 to FIG. 3 was actually formed and operated continuously to check a deterioration state of fiber coating. As compared with a conventional method (a structure in which a double clad fiber and a single clad fiber were simply subjected to fusion splicing), the result was that the progress of deteriorated fiber coating resin was delayed.

Further, in the fusion splicing structure of optical fibers given in FIG. 1 to FIG. 3, the fiber coating was measured for temperature rise to find that as compared with the conventional method, the temperature rise in the fiber coating was decreased by 90% or more. On the basis of estimation of the temperature rise, it was found that the service life of the resin was from substantially 30,000 hours to 50,000 hours and the reliability was greatly improved as compared with the conventional method.

In First Embodiment given in FIG. 1, the fusion splicing point 12 is enclosed by the aluminum block 13, and there is no chance that excitation light is irradiated on the coating or the resin etc., at the side of the proximal end from the fusion splicing point 12. Thus, such an advantage is obtained that the coating resin is prevented from burning or deterioration. In the present embodiment, excitation light is directly absorbed via the resin 14 into the aluminum block 13, thereby heat is highly dissipated.

In the embodiment given in FIG. 2, excitation light can be emitted in front of the fusion splicing point 12, thereby such an advantage is obtained that the fusion splicing point 12 is reinforced by using a resin or the like. Conventionally, since high-power light is emitted from the fusion splicing point 12, it is impossible to reinforce the point by using a resin or the like and there is a possibility that dust may adhere thereon.

The embodiment given in FIG. 3 is effective in a case where excitation light is available in a large amount. The resin 14 is changed in refractive index so that excitation light is emitted in a stepwise fashion. Therefore, an amount of heat discharge is dispersed to attain effective heat dissipation in the aluminum block 13 as a whole.

In the embodiment given in FIG. 3, the region E where the NA is transformed is divided to make the NA smaller from substantially 80% to 30% in a stepwise fashion, thereby heat can be effectively dissipated.

In order to change the NA, it is desirable to change the refractive index of a resin. However, selecting an appropriate resin for each refractive index will result in a greater variety of resins which then needs additional time and labor for evaluation and storage. In order to save time and labor, a resin having the refractive index to give substantially 80% of NA is selected in advance and mixed with separately provided colloidal silica. The colloidal silica is changed in mixing ratio, by which the NA can be easily changed to save time and labor.

As an explanation has been so far made for preferable embodiments of the present invention, to which the present invention shall not be, however, limited. The present invention may be subjected to an addition to the constitution, omission, replacement or other modifications within the scope of the present invention while not departing from the gist thereof. The present invention shall not be limited to the above description but will be limited only by the scope of the attached claims.

What is claimed is:

1. A fusion splicing structure of optical fibers for fusing a double clad fiber and a single clad fiber, the fusion splicing structure comprising
   a block covering a fusion splicing point of the double clad fiber and the single clad fiber, and which is made of a highly thermal conductive material.

2. The fusion splicing structure of optical fibers according to claim 1, wherein
   the fusion splicing structure is provided with a resin for coating at least any one of a clad of the double clad fiber and that of the single clad fiber in the vicinity of the fusion splicing point, and
   the light transmittance of the resin is 90% or higher in a light wavelength range of 800 nm to 1100 nm.

3. The fusion splicing structure of optical fibers according to claim 1, wherein
   the fusion splicing structure is provided with a resin for coating a clad of the single fiber, and
   the refractive index of the resin is higher than that of the clad of the single fiber.

4. The fusion splicing structure of optical fibers according to claim 1, wherein
   the fusion splicing structure is provided with a resin for coating a first clad of the double clad fiber inside the block,
   the refractive index of the resin is higher than that of the first clad, and
   the block is provided with an infrared-ray absorbing layer.

5. The fusion splicing structure of optical fibers according to claim 1, wherein
   any one of the double clad fiber or the single clad fiber is solidly adhered to one end of the block by using a hard resin, while the other is flexibly adhered to the other end of the block by using a soft resin, and
   the fiber adhered to the other end of the block by using the soft resin is solidly adhered to a substrate to which the block is fixed outside the block.

6. The fusion splicing structure of optical fibers according to claim 4, wherein
   the fusion splicing structure is provided with a resin for coating the fusion splicing point.

7. The fusion splicing structure of optical fibers according to claim 1, wherein
   the fusion splicing structure is provided with a resin for coating a first clad of the double clad fiber in front of the fusion splicing point,
   the refractive index of the resin is lower than that of the clad and also higher at a site closer to the fusion splicing point, and
   the double clad fiber is decreased in numerical aperture.

8. The fusion splicing structure of optical fibers according to claim 7, wherein
   the fusion splicing structure is provided with a resin for coating the fusion splicing point.

9. The fusion splicing structure of optical fibers according to claim 1, wherein
   an infrared absorbing material is formed on the surface of the block excluding a region where substantially 20% to 90% of an amount of the emitted excitation light is initially reflected, but the infrared absorbing material is not formed at the region.

10. The fusion splicing structure of optical fibers according to claim 1, wherein the fusion splicing point is accommodated in an internal space of the block.

* * * * *